United States Patent [19]

van Gelder et al.

[11] Patent Number: 4,470,958

[45] Date of Patent: Sep. 11, 1984

[54] COMPOSITION AND PROCESS FOR THE REMOVAL OF IMPURITIES FROM COMBUSTION GASES

[75] Inventors: Kees van Gelder; Rene M. Visser; Jan Werner, all of Amsterdam, Netherlands

[73] Assignee: Shell Oil Company, Houston, Tex.

[21] Appl. No.: 418,855

[22] Filed: Sep. 16, 1982

[30] Foreign Application Priority Data

Nov. 18, 1981 [NL] Netherlands ................... 8105225

[51] Int. Cl.$^3$ ............................................ B01D 53/34
[52] U.S. Cl. ............................ 423/210.5; 423/232; 252/189; 252/192
[58] Field of Search ........... 423/210.5, 232, DIG. 12; 266/120; 148/26; 252/189, 192

[56] References Cited

U.S. PATENT DOCUMENTS

| | | | |
|---|---|---|---|
| 3,886,251 | 5/1975 | Sekiguchi et al. | 264/184 |
| 3,919,390 | 11/1975 | Moore | 423/210.5 |
| 4,086,323 | 4/1978 | Moore et al. | 423/210.5 |

*Primary Examiner*—Earl C. Thomas

[57] ABSTRACT

A low melting, eutectic melt salt composition comprising $Li_2CO_3$, $Na_2CO_3$ and $K_2CO_3$, also containing $MnCO_3$, is disclosed including its use as a melt in the process for the removal of contaminants, e.g., $H_2S$, COS and/or fly ash, from gases obtained by partial oxidation/combustion.

11 Claims, No Drawings

COMPOSITION AND PROCESS FOR THE REMOVAL OF IMPURITIES FROM COMBUSTION GASES

BACKGROUND OF THE INVENTION

1. Field of the Invention

This invention relates to a metal salt composition, in particular for the removal of impurities from combustion gases. The invention further relates to a process for the removal of impurities from combustion gases using such a metal salt composition.

2. Description of the Prior Art

Greater importance today is being placed on the manufacture and use of combustion gases. Combustion gases include the gaseous products from complete or partial combustion, specifically including, e.g., synthesis gas, pyrolysis gas and flue gases. The synthesis gas may have been formed by gasification of, for instance, a heavy mineral oil fraction or coal.

The impurities occurring in this type of gases are partly of a solid nature, called fly ash particles, and partly of a gaseous nature, e.g., $H_2S$, COS and organic sulfur compounds. It is essential that these impurities be removed in view of environmental and technical considerations.

One method to remove these impurities at ambient temperature and pressure is by use of a tetrahydrothiophene dioxide/alkanolamine mixture. But if the gases are to be used as feed for a gas turbine, as will be the case in the prospective combinations of a coal gasification plant with an electric power station ("combined cycle power plants"), it is not very efficient to carry out this gas purification at a low temperature. This is because the efficiency of the combination will be higher when the purification is carried out at higher temperatures, since in this way the perceptible heat will be conserved better. As the maximum inlet temperature of a gas turbine—before combustion—is about 550° to 600° C., the gas purification should preferably be carried out at that temperature.

Only a small number of liquids are suitable for use as absorbent liquids at that temperature, and those liquids almost invariably consist of molten salts. However, the salt or mixture of salts used should meet certain requirements, which will restrict the range of choice:

(1) good capacity for the selective removal of $H_2S$, COS and organic sulfur compounds,
(2) stability at the prevailing temperature,
(3) very low vapor pressure,
(4) low corrosivity,
(5) easy regenerability, i.e., reconversion of the sulfides formed into the original metal salt composition,
(6) inertness with regard to the combustion gas, and
(7) inertness with regard to the inorganic solid impurities, so that the latter can easily be removed by hot filtration.

A well-known composition which meets some of these requirements is the ternary mixture of potassium carbonate, lithium carbonate and sodium carbonate, which is fluid at the prevailing temperature, along with some calcium carbonate dissolved therein as an active component. Such mixtures and their use in purifying gas streams are obtained in U.S. Pat. Nos. 3,919,390 and 4,086,323. The ternary mixture is fluid because the three components can constitute an eutectic mixture, the melting point of the pure eutectic being 397° C. The absorbancy of this metal salt composition is high at a temperature of, say, 700° C., but regeneration—by steam and carbon dioxide being passed through—is slow and should preferably be carried out at the lowest possible temperature in order that the $H_2S$ gas formed may be sufficiently concentrated for processing in a Claus plant. Operation at a low temperature, i.e., as little as possible above the eutectic temperature, entails the risk of sudden solidification of the melt owing to solid impurities (fly ash) and products of corrosion. It has further been found that only a limited quantity of calcium carbonate can be dissolved in the mixture of lithium carbonate, sodium carbonate and potassium carbonate. Moreover, the maximum quantity of sulfur that can be removed by the calcium carbonate is rather limited, in other words, at the absorption temperature of about 550° C. aimed at, the equilibrium $$CaCO_3 + H_2S \rightarrow CaS + H_2O + CO_2$$

lies not entirely to the right.

SUMMARY OF THE INVENTION

It has now been found that the above drawbacks in using a potassium carbonate, lithium carbonate, sodium carbonate salt mixture can be overcome by using manganese carbonate in place of calcium carbonate as the active component. The invention therefore relates to a metal salt composition, in particular for the removal of impurities from combustion gases, which composition comprises a mixture of potassium carbonate, lithium carbonate and sodium carbonate with the addition of manganese carbonate.

The manganese carbonate has been found to dissolve more readily in the alkali carbonates than does calcium carbonate. Moreover, at the desired absorption temperature of about 550° C., the equilibrium $$MnCO_3 + H_2S \rightarrow MnS + H_2O + CO_2$$

is much more favorable, i.e., more to the right, so as to allow more $H_2S$ to be bound per mole of $MnCO_3$ added than per mole of $CaCO_3$ added. The latter phenomenon is surprising, for we know of no previous attempt to measure thermodynamic data on this equilibrium in solution, it being presumed that $MnCO_3$ would behave as pure undissolved $MnCO_3$ does at such high temperatures—i.e., it would decompose. However, experience in actual practice has shown that in the melt of the alkali metal salts such decomposition hardly occurs, if at all, and that manganese carbonate is, in effect, a reversible absorbent. Over the temperature range of about 500° to about 550° C., manganese carbonate appears to be capable of absorbing about 1.3 times as much $H_2S$ per liter (1) of metal salt composition as calcium carbonate, starting from equal molar concentrations.

However, what may be the most important advantage of the composition according to the invention is the fact that regeneration need no longer be carried out at a temperature just above the solidifying point, with all its risks, but that it can now be carried out at higher temperatures and in the same range where absorption takes place. Hence, there is no, or less, need for periodic warming up and cooling, with the risk of sudden "freezing" being removed.

DETAILED DESCRIPTION OF THE INVENTION

The metal salt composition comprises a mixture of (Li-Na-K)$_2$CO$_3$ and MnCO$_3$, in which the relative proportions of the metal ions may vary within wide limits in relation to the eutectic composition of the ternary mixture of alkali metal salts. By mol percentage this eutectic composition amounts to: 43.5% Li$_2$CO$_3$/31.5% Na$_2$CO$_3$/25.0% K$_2$CO$_3$. The mixture advantageously comprises 15 to 45% mol (m) Li$_2$CO$_3$, 20 to 40%m Na$_2$CO$_3$, 20 to 35%m K$_2$CO$_3$ and 1 to 22%m MnCO$_3$. The most suitable composition may be determined in accordance with the cost price of the various components and the physical properties desired.

Preferably the mixture comprises 8 to 18%m MnCO$_3$; this corresponds to about 10 to 20%m calculated on 100% ternary mixture. In particular a composition is used comprising 15%m MnCO$_3$, dissolved in a mixture of 43.5%m Li$_2$CO$_3$, 31.5% Na$_2$CO$_3$ and 25.0% K$_2$CO$_3$.

The metal salt composition may be prepared simply by combining the individual carbonates in the right proportion, but they may also be prepared starting from other compounds of the metals required, for instance potassium hydroxide or manganese hydroxide, and converting these compounds in situ into the carbonates. Usually this conversion will be brought about by reaction with carbon dioxide or another carbonate. Thus, manganese(II) oxide, MnO, can be converted into manganese carbonate through introduction into a melt of alkali metal carbonates. This is not to say that in such a salt melt the compounds involved are in the actual molecular form—they might also be present in an ionized state, and complex or associated or dissociated forms are conceivable as well. It is for the sake of convenience that the composition described in this application is referred to as a mixture of four carbonates.

The invention further relates to a process for the removal of impurities, in particular sulfur-containing impurities, from combustion gases by contacting them with an absorbent liquid, characterized in that the absorbent liquid initially consists of a molten metal salt composition according to the invention.

Preferably the molten metal salt composition has a temperature in the range of from about 400° to about 600° C. The solidifying point of the quaternary mixture is found to be even somewhat below 397° C., the solidifying point of the ternary eutectic mixture, which might be interpreted as an effect of freezing point depression.

In operational use, part of the manganese carbonate will be converted into manganese sulfide. This reaction comes about almost instantaneously. Naturally, the location of the equilibrium is dependent on the concentration of the sulfur-containing impurities present in the combustion gas, the temperature and the concentration of manganese carbonate in the salt melt.

Preferably the metal salt composition used is at least partly regenerated through contact with a regeneration gas. This is done advantageously whenever the equilibrium load of sulfide has been reached. If the combustion gas contains about 0.25% volume (v) H$_2$S, and the gas and the salt composition have a temperature of about 530° C., then—assuming that at the start 15%m MnCO$_3$ was present in 100% ternary mixture—the equilibrium load will be about 2 moles of sulfide per liter of molten salt composition. For technical reasons it may at times be more advantageous to carry out the regeneration at an earlier stage, when about 1.5 mole of sulfide per liter of molten salt composition has been absorbed.

As stated above, regeneration can take place at about the same temperature as the absorption of sulfide. In order to shift the equilibrium in the desired direction, the flow of sulfur impurities will be cut off and replaced with a regeneration gas. The reaction equation given hereinbefore shows that this regeneration gas advantageously comprises H$_2$O and/or CO$_2$.

In one embodiment the regeneration gas advantageously comprises steam. In that case preferably the temperature is not lower than about 700° C. In this embodiment the manganese sulfide formed is regenerated to form manganese monoxide, which, owing to the excess carbonate in the melt, is transformed at least partly into manganese carbonate. At such temperatures there is no risk of freezing of the melt. This is significant when compared to a composition comprising CaCO$_3$ instead of MnCO$_3$. For it is impossible to obtain CaO by this method unless the temperature is raised to 1500° C. In another embodiment the regeneration gas advantageously comprises a mixture of steam and carbon dioxide. In this case the temperature preferably is not lower than about 450° C. In this embodiment manganese carbonate is formed direct from manganese sulfide. Here too, the regeneration temperature still lies at a sufficiently high level above the solidifying point of the melt. In both the embodiments a gas is formed which comprises more than 10%v H$_2$S. This is sufficiently concentrated for processing in a Claus plant to form elemental sulfur.

The present process is suitable for use in continuous or in semi-continuous operation. For instance, in a plant for the removal of impurities from combustion gases, two or more vessels can be placed containing molten metal salt compositions according to the invention which, by passing through the streams of regeneration gas and combustion gas, respectively, in turn are regenerated partly, and partly absorb impurities. The gas pressures may vary within wide limits, e.g., of from 0.1 to 40 bar.

Continuous operation may be undertaken by allowing the melt to be contacted with the contaminated combustion gas in, for instance, a venturi. The salt melt loaded with sulfur is recirculated, and is regenerated en route, optionally in a second venturi.

This plant may also include a device for the removal of the fly ash, such as a hot filter means, a settling tank and the like. Usually it is not necessary to clean the complete supply of salt melt of impurities; carrying out this purification at intervals or treating a bleed stream from the recycle loop in a continuous process will be sufficient.

The process and the composition according to the invention are now illustrated with the aid of the following examples, which are included for illustration purposes only and are not necessarily meant to limit the invention to the particular reactants and conditions employed therein.

EXAMPLE 1

In Example 1, 300 g of an alkali metal salt composition comprising 43.5%m Li$_2$CO$_3$, 31.5%m Na$_2$CO$_3$ and 25.0%m K$_2$CO$_3$, is mixed with 60.9 g MnCO$_3$. For comparison another composition is prepared by adding 53.0 g CaCO$_3$ to 300 g of the above-mentioned alkali metal salt composition.

In a specifically designed corrosion-proof reactor the quaternary composition is heated to 530° C. and subsequently contacted with a large excess of combustion gas (0.25%v $H_2S$; 1.9%v $CO_2$; 5%v $H_2O$; 12.4%v $H_2$; 28.6%v CO; 0.023%v COS; 0.020%v HCN; 52.4%v $N_2$) at a pressure of 20 bar. The equilibrium is established immediately.

Analysis of the salt melt shows that the $MnCO_3$-containing melt comprises 9%m MnS, which corresponds to an $H_2S$ capacity of about 2 moles $H_2S$/liter melt. The $CaCO_3$-containing melt comprises 5%m CaS, which corresponds to an $H_2S$ capacity of about 1.5 moles $H_2S$/liter melt.

The regeneration of the melt initially containing $MnCO_3$ takes place at 600° C. through contacting with a regeneration gas comprising 67%v steam and 33%v $CO_2$, at a pressure of 20 bar. The regeneration off-gas comprises 16.1%v $H_2S$, which is more than sufficient for further treatment in a Claus process. Passing this regeneration gas through the melt initially containing $CaCO_3$ at 600° C. yields no more than 8%v $H_2S$, which is insufficient for further treatment in a Claus process. Only at a temperature below 500° C. does regeneration of the melt initially containing $CaCO_3$ at 600° C. yields no more than 8%v $H_2S$, which is insufficient for further treatment in a Claus process. Only at a temperature below 500° C. does regeneration of the melt initially containing $CaCO_3$ yield an off-gas which is sufficiently rich in $H_2S$. However, at temperatures below 500° C. the risk of sudden freezing of the melt grows. Moreover, regeneration at temperatures below 500° C. takes four times as much time as regeneration at 600° C.

EXAMPLE 2

A regenerated salt melt which comprises 14.5%m $MnCO_3$ and 0.5%m MnS and otherwise has a composition as stated in Example 1, is contacted in a countercurrent reactor with the combustion gas of Example 1 at a temperature of 530° C. and a pressure of 20 bar. The residence time of the gas is 1 minute, which is sufficient for the equilibrium to be established completely. The salt melt leaving the reactor includes 9%m MnS. The purified gas now contains no more than 38 ppm $H_2S$, which corresponds to 98.5% desulfurization.

For comparison a regenerated salt melt which comprises 14.5%m $CaCO_3$ and 0.5%m CaS and otherwise has a composition as stated in Example 1 is contacted in the afore-mentioned countercurrent reactor with the afore-mentioned gas at 530° C., 20 bar and a residence time of 1 minute. This results in a salt melt comprising 5%m CaS and a purified gas stream still comprising 385 ppm $H_2S$, which corresponds to only 85% desulfurization.

What is claimed is:

1. A metal salt composition useful for the removal of $H_2S$ from combustion gases, said composition comprising a molten mixture of potassium carbonate, lithium carbonate, sodium carbonate and manganese carbonate.

2. The metal salt composition of claim 1 wherein said mixture comprises 15 to 45%m $Li_2CO_3$, 20 to 40%m $Na_2CO_3$, 20 to 35%m $K_2CO_3$ and 1 to 22%m $MnCO_3$ based on the total of the four components.

3. The metal salt composition of claim 2 wherein said mixture comprises 8 to 18%m $MnCO_3$.

4. A process for the removal of $H_2S$ from combustion gases comprising contacting said gases with a molten mixture of potassium carbonate, lithium carbonate, sodium carbonate, and manganese carbonate.

5. The process of claim 4 wherein the temperature of said molten mixture is about 400° C. to about 600° C.

6. The process of claim 4 wherein said molten mixture comprises 15 to 45%m $Li_2CO_3$, 20 to 40%m $Na_2CO_3$, 20 to 35%m $K_2CO_3$ and 1 to 22%m $MnCO_3$.

7. The process of claim 4 wherein said molten mixture is at least partly regenerated through contact with a regeneration gas.

8. The process of claim 4 wherein the combustion gases also contain COS and fly ash, and the COS and fly ash are removed.

9. The process of claim 8 wherein said molten metal salt composition is regenerated whenever the equilibrium load of sulfide has been reached.

10. The process of either of claims 6 or 9 wherein said regeneration gas comprises steam.

11. The process of either of claims 6 or 9 wherein said regeneration gas comprises a mixture of steam and carbon dioxide.

* * * * *